United States Patent
Tavella

[11] 3,808,083
[45] Apr. 30, 1974

[54] COMPOSITE RESILIENT ELEMENT OF RUBBER AND METAL

[75] Inventor: Corrado Tavella, Milan, Italy

[73] Assignee: Societa Applicazioni Gomma Antivibranti SAGA S.P.A., Milan, Italy

[22] Filed: May 4, 1972

[21] Appl. No.: 250,385

[30] Foreign Application Priority Data
June 8, 1971 Italy.................................. 25534/71

[52] U.S. Cl........................ 161/42, 64/11, 161/221, 308/238
[51] Int. Cl. ... B32b 1/04, B32b 15/06, F11c 27/00, F16d 3/28
[58] Field of Search ........ 29/244; 161/42, 213, 221; 64/2, 6, 11, 14; 308/238, 237, 239

[56] References Cited
UNITED STATES PATENTS

| 3,519,260 | 7/1970 | Irwin | 64/11 R |
| 3,072,449 | 1/1963 | Morley et al. | 308/238 |
| 2,989,355 | 6/1961 | Terhorst | 308/238 |
| 3,464,285 | 9/1969 | McCabe | 64/2 R |
| 3,464,287 | 9/1969 | McCabe | 64/2 R |
| 3,015,969 | 1/1962 | Bratz | 64/2 R |

Primary Examiner—Philip Dier
Attorney, Agent, or Firm—Sughrue, Rothwell, Mion, Zinn & Macpeak

[57] ABSTRACT

A rubber-metal bush comprises a generally tubular body of rubber in which, during manufacture, a series of metal washers is embedded. The washers have an inner diameter greater than the inner diameter of the rubber body, but project radially outwardly of it.

3 Claims, 1 Drawing Figure

PATENTED APR 30 1974   3,808,083
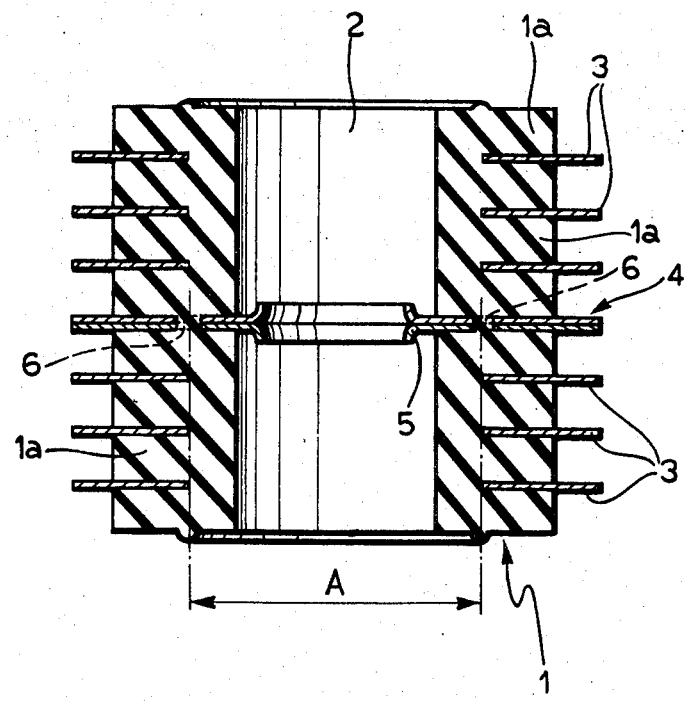

COMPOSITE RESILIENT ELEMENT OF RUBBER AND METAL

The present invention relates to resilient elements and particularly to such elements made from rubber and metal. Resilient elements of this type find particular utility for use in push-pull hooks.

For such purposes it is known to employ resilient elements formed by several rubber discs or rings intercalated with a number of steel discs or rings to form a stack. It is also known to employ resilient elements formed by several superimposed components each of which is formed by two rubber rings separated by a steel disc which has a series of apertures at a suitable radius, so that the two rubber rings can be bonded to each other so as to securely form a single component with the metal disc.

The above types of resilient elements require the manual assembly of all the parts thereof, and this takes a considerable time and increases the total cost of the elements. To avoid this inconvenience the present invention seeks to provide a resilient element of the above mentioned type, which acts as a number of single elements, thereby avoiding the necessity for mounting and assembling operations.

According, therefore, to the present invention, there is provided a composite resilient element characterised in that it comprises a unitary tubular rubber component, in which there are embedded a plurality of regularly spaced transverse annular metal components which project outwardly from the resilient tubular element, the inner diameter of the annular metal components being greater than the inner diameter of the tubular rubber component.

One embodiment of the invention will now be more particularly described, by way of example, with reference to the accompanying drawing, which is a schematic axial section thereof.

The resilient element shown in the drawing comprises a tubular rubber component 1 having an axial bore 2. Embedded in the component 1 there are axially spaced metal rings 3 the plane of each of which extends transverse the axis of the component 1. The outer diameters of the metal rings 3 which may, for example, be made of steel plate, are larger than the outer diameter of the rubber tube so as to project therefrom, whereas their inner diameter is larger than the inner diameter of the tubular rubber portion 1 so as to be embedded within the rubber. The inner diameters of the metal rings 3 are so chosen, with respect to the inner and outer diameters of the tubular rubber component 1, that the inner diameters lie on the neutral diameter of the rubber. The neutral diameter is that distance at which there is no lateral movement of the rubber under axial compression whereas at greater diameters than this the rubber moves laterally outwardly, and at smaller diameters laterally inwardly. The selection of the neutral diameter for the inner diameter of the rings 3 minimises the risk of tearing the rubber as there is no relative movement between the metal and the rubber at this position.

The metal rings 3 effectively subdivide the tubular rubber component 1 into a number of rings 1a, the number of which varies according to the number of metal rings 3. The number of rings 3 is normally chosen so that the complete assembly provides the required resilience for the application in question, although in some cases this may not be possible. For example, in the case of buffers, it may be necessary to use two such elements, each of which comprises eight or ten rings, to simplify the production of the buffer.

The elements may, for example, be used with central connecting rods, in which case it may be desirable to provide a guide for the rod. In such a case one of the steel rings, for example the intermediate ring 4, can extend into the bore of the tubular portion 1 and carry an annular bearing surface 5 for guiding the rod. The ring 4 has a number of apertures 6 spaced around the neutral diameter through which the rubber of the two adjacent rings can be bonded to secure together the two parts on either side of the ring 4 to form an integral assembly. This is preferred rather than forming a metal-rubber bond, since the rubber then effectively forms a unitary body.

It will be appreciated that the resilient element described above does not require manual assembly such as has previously been required to put together a number of single elements of the previously known composite type.

What we claim is:

1. A composite resilient element comprising a unitary tubular rubber component in which there are embedded a plurality of regularly spaced transverse annular metal components which project outwardly from the resilient tubular element, the inner diameters of the annular metal components being greater than the inner diameter of the tubular rubber component.

2. A composite resilient element as claimed in claim 1, in which the inner diameters of the annular metal components coincide with the neutral diameter of the tubular rubber component.

3. A composite resilient element as claimed in claim 1, in which one of the annular metal components has an inner diameter less than the inner diameter of the tubular rubber component, and an annular inner bearing surface, the said one component having a number of spaced apertures at the neutral diameter of the tubular rubber component, through which the rubber on either side of the said one component is bonded to form an integral assembly.

* * * * *